United States Patent
Stroffolino et al.

(10) Patent No.: US 12,167,063 B2
(45) Date of Patent: *Dec. 10, 2024

(54) ADAPTIVE BITRATE STREAMING

(71) Applicant: Comcast Cable Communications, LLC, Philadelphia, PA (US)

(72) Inventors: Philip John Stroffolino, Media, PA (US); Jaikumar Subramanian, Devon, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/170,927

(22) Filed: Feb. 17, 2023

(65) Prior Publication Data

US 2023/0239526 A1 Jul. 27, 2023

Related U.S. Application Data

(63) Continuation of application No. 17/447,243, filed on Sep. 9, 2021, now Pat. No. 11,611,789, which is a continuation of application No. 16/920,779, filed on Jul. 6, 2020, now Pat. No. 11,146,839.

(51) Int. Cl.
| | |
|---|---|
| H04N 21/2662 | (2011.01) |
| H04L 65/80 | (2022.01) |
| H04N 21/2343 | (2011.01) |
| H04N 21/6379 | (2011.01) |
| H04N 21/845 | (2011.01) |

(52) U.S. Cl.
CPC ......... *H04N 21/2662* (2013.01); *H04L 65/80* (2013.01); *H04N 21/23439* (2013.01); *H04N 21/6379* (2013.01); *H04N 21/8456* (2013.01)

(58) Field of Classification Search
CPC ....... H04N 21/23439; H04N 21/64738; H04N 21/2387; H04L 65/60
See application file for complete search history.

(56) References Cited

U.S. PATENT DOCUMENTS

| | | | |
|---|---|---|---|
| 9,407,564 B2 * | 8/2016 | Major | H04N 21/44204 |
| 11,146,839 B1 | 10/2021 | Stroffolino et al. | |
| 2009/0254657 A1 * | 10/2009 | Melnyk | H04L 65/65 709/224 |
| 2015/0100701 A1 | 4/2015 | Mao et al. | |

(Continued)

OTHER PUBLICATIONS

US Patent Application filed on Jul. 6, 2020, entitled "Adaptive Bitrate Streaming", U.S. Appl. No. 16/920,779.

(Continued)

*Primary Examiner* — Chirag R Patel
(74) *Attorney, Agent, or Firm* — BakerHostetler

(57) ABSTRACT

Systems and methods are described for performing adaptive bitrate (ABR) streaming. A user device may request a segment of a first version of a plurality of versions of a content asset from a content provider, and may receive the segment. An estimated time to receive a second segment of a second version of the content may be determined based on metrics associated with receipt of the segment of the first version and in a manner that takes into account latency with the network, such that a determination whether to switch to a higher or lower bitrate version of a content asset during ABR streaming may be more accurately made.

30 Claims, 5 Drawing Sheets

(56) References Cited

U.S. PATENT DOCUMENTS

| | | |
|---|---|---|
| 2016/0134673 A1 | 5/2016 | MacInnis |
| 2017/0171577 A1 | 6/2017 | Kipp |
| 2017/0331875 A1 | 11/2017 | Houze |
| 2017/0339207 A1 | 11/2017 | Mueller et al. |
| 2018/0139258 A1* | 5/2018 | Margolin ........... H04N 21/6582 |
| 2018/0248806 A1 | 8/2018 | Burnley |

OTHER PUBLICATIONS

US Patent Application filed on Sep. 9, 2021, entitled "Adaptive Bitrate Streaming", U.S. Appl. No. 17/447,243.

* cited by examiner

| Version of Content Asset | Encoding Bitrate (Mbps) | Content Segment Size (kilobytes) | Total Segment Download Time (seconds) | Estimated Available Bandwidth (Mbps) |
|---|---|---|---|---|
| 1 | 5.1 (lowest quality) | 1090.909091 | 0.409090909 | 21.84533333 |
| 2 | 12.7 | 2716.57754 | 1.018716578 | 21.84533333 |
| 3 | 18.7 (best quality) | 4000 | 1.5 | 21.84533333 |

FIG. 1

| Version of Content Asset | Encoding Bitrate (Mbps) | Content Segment Size (kilobytes) | Total Segment Download Time (+0.5s latency) | Estimated Available Bandwidth (Mbps) |
|---|---|---|---|---|
| 1 | 5.1 (lowest quality) | 1090.909091 | 0.909090909 | 9.8304 |
| 2 | 12.7 | 2716.57754 | 1.518716578 | 14.65329577 |
| 3 | 18.7 (best quality) | 4000 | 2.0 | 16.384 |

FIG. 2

ADAPTIVE BITRATE STREAMING

CROSS-REFERENCE TO RELATED APPLICATIONS

This application is a continuation of U.S. patent application Ser. No. 17/447,243, filed Sep. 9, 2021, now U.S. Pat. No. 11,611,789, issued on Mar. 21, 2023, which is a continuation of U.S. patent application Ser. No. 16/920,779, filed Jul. 6, 2020, now U.S. Pat. No. 11,146,839, issued on Oct. 12, 2021, which is hereby incorporated by reference in its entirety.

BACKGROUND

Adaptive bitrate (ABR) streaming is a process used to deliver content to a user device for output, or playback, to a user. The content may comprise audio content, video content and/or other content. The content may be encoded into different versions, each having a different encoding bitrate. Versions of the content encoded at higher bitrates typically have the best playback quality. The user device may select different versions of the content for playback, depending on network conditions. For example, if the network bandwidth available to the user device is high, the user device may request a higher bitrate version of the content in order to provide the best quality. However, if network conditions deteriorate, and the bandwidth available to the user device is reduced, the user device may switch to a lower bitrate version of the content in order to prevent issues during playback, such as freezing or stalls, that would result in a poor user experience.

In typical ABR streaming implementations, a user device relies on bandwidth estimation in order to determine whether to switch to a different version of content having a lower or higher bitrate. A user device may periodically estimate the available bandwidth based on statistics associated with recently received content, such as the time required to download a given portion of the content. Bandwidth estimation works well in systems in which the latency associated with requesting and receiving portions of content is low. However, when such latency is high, bandwidth estimation may be less accurate, causing a user device to fail to switch to a different bitrate version of the content when network conditions would otherwise warrant such a switch. Thus, improved techniques for ABR streaming are needed.

SUMMARY

Systems and methods are described for performing adaptive bitrate (ABR) streaming. A user device may request a segment of a first version of a plurality of versions of a content asset from a content provider, and may receive the segment. A latency associated with receiving at least a first portion of the segment may be determined. A total time to receive the segment may be determined. Based on a removal of the latency from the total time, an estimated time to receive a second segment of a second version of the content asset may be determined. The second version of the content asset may be encoded at a higher bitrate than the first version. The estimated time to receive the second segment of the second version of the content asset may be compared to a threshold. If the estimated time satisfies the threshold, the user device may determine to switch to requesting segments of the second version of the content asset. If the threshold is not satisfied, the user device may continue to request segments of the first version of the content asset. By estimating the time to receive the second segment of the second version of the content asset in a manner that takes into account the latency associated with receiving a segment of the content asset, the determination whether to switch to a higher or lower bitrate version of the content asset during ABR streaming may be more accurately made.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

The following drawings show generally, by way of example, but not by way of limitation, various examples discussed in the present disclosure. In the drawings:

FIG. 1 shows a table comprising information concerning three versions of a content asset;

FIG. 2 shows another table comprising information concerning the three versions of the content asset.

DETAILED DESCRIPTION

Figure 3:
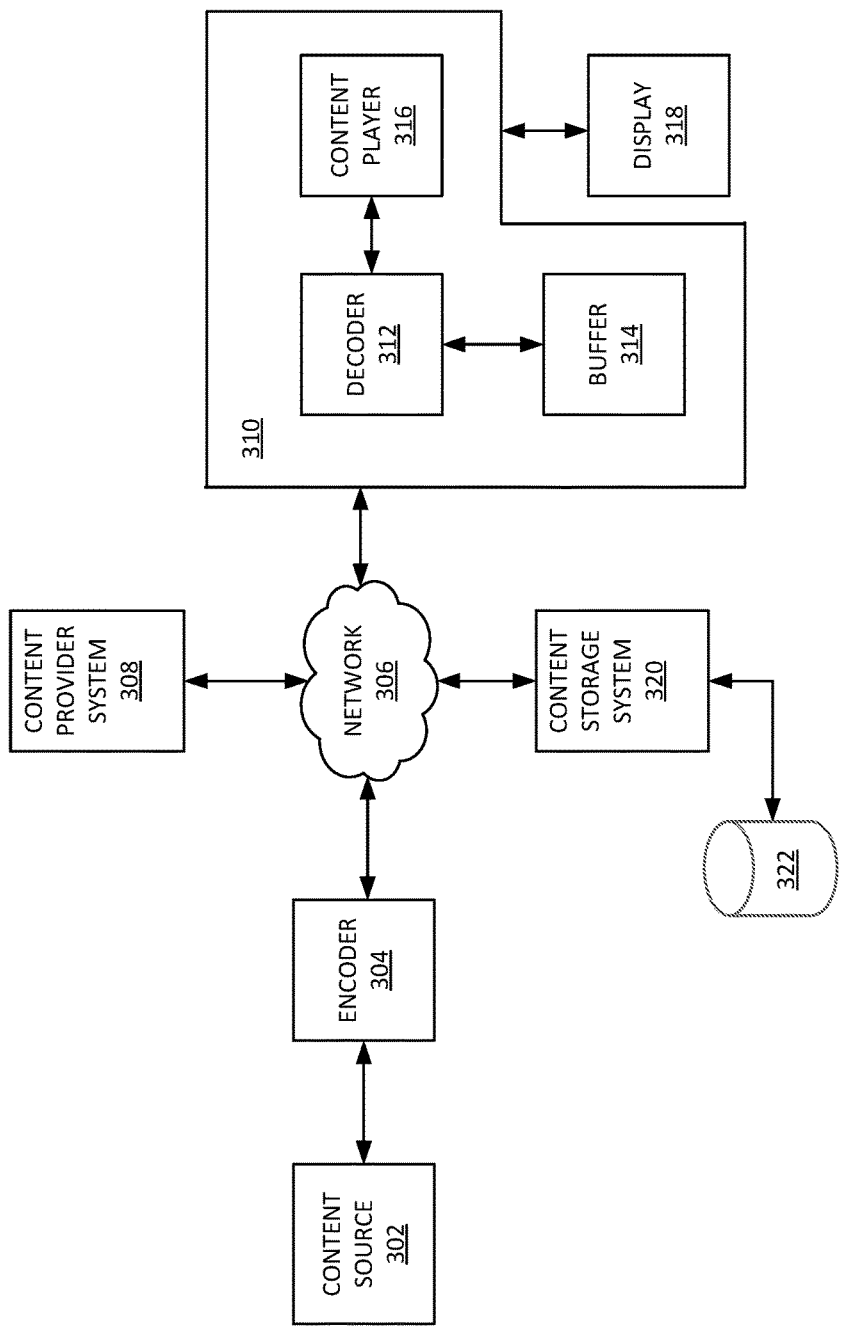
FIG. 3 shows an example system.

A content asset may comprise one or more of linear content, non-linear content, video content, audio content, multi-media content, a movie, a television show, a presentation, a song, an album, a live broadcast, recorded content, stored content, or any other form of content a user may wish to consume. A content asset may comprise one or more versions of the content, each of which may be referred to as a stream. Each version may comprise a different encoding of the content asset. Each version may have properties that differ from other versions, such as a different encoding bitrate, compression technique, compression ratio, resolution, frame rate, video quality (for video), number of channels, or sampling rate (for audio). Each version of a content asset may comprise a plurality of portions. Each portion may comprise one or more segments, sometimes also referred to as chunks or fragments, which may be independently accessible for playback on a user device.

Each segment may correspond to some portion of the playback time, or presentation duration, of the content. For example, each segment may have a presentation duration of two seconds of the content. Each segment may have a presentation duration of another length, such as 4, 6, or 8 seconds. Because the segments of different versions of the content may be encoded at different bitrates, segments of different streams that correspond to a same playback time/duration typically have different sizes. For example, a two second segment encoded at a higher bitrate may comprise more data (e.g., bits or bytes) than the corresponding two second segment encoded at a lower bitrate.

A version, or stream, of a content asset may be described in a manifest, and a user device may use the manifest to request segments of a version for playback on the user device. For each segment of a version of the content asset, the manifest may comprise information identifying a network location, such as a uniform resource indicator (URI) or uniform resource locator (URL), from which the segment may be retrieved. A user device may send a request to the content provider to retrieve a segment of the content, identifying the segment by its associated URI or URL. For example, the user device may send a hypertext transfer protocol (HTTP) GET request to the content provider.

As discussed above, ABR streaming is a client-managed technique in which a user device monitors network conditions over time, such as available bandwidth, and switches among different versions of a content asset during playback depending on the determined network conditions. For example, if the network bandwidth available to the user device is high, the user device may request a higher bitrate version of the content for playback. However, if network conditions deteriorate, and the bandwidth available to the user device is reduced, the user device may switch to a lower bitrate version of the content in order to prevent issues during playback that would result in a poor user experience, such as freezing or stalling of the displayed content. Example implementations of adaptive bitrate streaming techniques include MPEG DASH (Dynamic Adaptive Streaming over HTTP) and Apple HLS (HTTP Live Streaming).

In ABR streaming implementations, a user device may rely on bandwidth estimation in order to determine whether to switch to a different version of content having a lower or higher bitrate. A user device may periodically estimate the available bandwidth based on aggregated statistics associated with recently received content, such as the time required to download a recent segment of the content. If the estimated available bandwidth is sufficient to support receiving a higher bitrate version of the content, the user device may switch to the higher bitrate version from that point forward. If the estimated available bandwidth is insufficient to support download of the current version of the content, the user device may choose to switch to a lower bitrate version to avoid issues with playback, such as stalls or freezing, that would result in a poor user experience.

For example, assume there are at least three versions of a content asset—a low-bitrate version encoded at a bitrate of 5.1 Mbps, a mid-bitrate version encoded at a bitrate of 12.7 Mbps, and a high bitrate version encoded at a bitrate of 18.7 Mbps. If a user device is currently requesting and receiving segments of the mid-bitrate version (12.7 Mbps), and the device estimates that the available bandwidth of the network is 21.8 Mbps, the user device may choose to switch to receiving segments of the high-bitrate version (18.7 Mbps).

Bandwidth estimation may work well in systems in which the latency associated with requesting and receiving portions of content is low. Latency, as used herein, may refer to the time it takes from the sending of a request for a segment of a version of a content asset to the receipt of a first portion of the requested segment, such as the first bit or first byte of the segment. A variety of factors can cause or contribute to such latency, such as distance from the content source, network or server congestion, the number of intermediate network devices a segment must traverse, packet queuing in the network, delays in retrieval of content from storage, server processing delays, and other network, router, or server issues. Other causes of latency may include time associated with setup of the transmission of the segment, encoding of the segment, network path set up, or other delays that may be introduced by a headend system and/or a content provider system.

When such latency is high, bandwidth estimation may be less accurate, causing a user device to fail to switch to a different bitrate version of the content when network conditions would otherwise warrant such a switch. The problem associated with latency may be illustrated with reference to FIGS. 1 and 2.

FIG. 1 shows a table comprising information concerning three versions of a content asset, versions 1, 2, and 3. The table includes example content segment sizes (in kilobytes) and associated total download times (i.e., the time, in seconds, from sending a request for the segment to receipt of the entire segment) for each of the three different versions 1, 2, and 3 of the content assets, in a system with little or no latency. As shown, in this example, version 1 of the content asset may be encoded with a bitrate of 5.1 Mbps, version 2 of the content asset may be encoded with a bitrate of 12.7 Mbps, and version 3 may be encoded with a bitrate of 18.7 Mbps. As further shown, at the encoding bitrate of 5.1 Mbps, the typical size of a segment of version 1 of the content asset is 1090.909091 kbytes. At the encoding bitrate of 12.7 Mbps, the typical size of a segment of version 2 of the content asset is 2716.57754 kbytes, and at the encoding bitrate of 18.7 Mbps, the typical size of a segment of version 3 of the content asset is 4000 kbytes. Because in this example there is no latency associated with requesting and receiving the segments of the different versions of the content asset, the total segment download times for segments of each version will be proportional to their respective sizes. For example, the total segment download time for a segment of version 1 of the content asset may be 0.0409090909 seconds. The total segment download time for a segment of version 2 of the content asset may be 1.018716578 seconds, and the total segment download time for a segment of version 3 of the content asset may be 1.5 seconds.

Because in the example of FIG. 1 there is no latency, if estimated available bandwidth is determined by a user device based on the size and total download time of a most recently received segment, then no matter which version of the content asset is currently being requested and received by the user device, the user device will calculate the same, or substantially the same, estimated available bandwidth, which in this example may be 21.84533333 Mbps. Consequently, if the user device is currently receiving segments of version 1 of the content asset, the user device may determine to switch to higher bitrate version (e.g., version 2 or version 3) to obtain better quality, as the estimated available bandwidth of 21.84533333 Mbps should be sufficient to accommodate receiving even the highest bitrate version (e.g., version 3 encoded at 18.7 Mbps) without encountering issues (e.g., freezes or stalls) during playback. And as long as network conditions remain stable at the estimated bandwidth of 21.84533333 Mbps, the user device may determine to continue requesting and receiving segments of version 3 of the content asset.

FIG. 2 shows another table comprising example information concerning the three versions of the content asset, versions 1, 2, and 3, but this time in a system in which there is a latency associated with requesting and receiving segments of the various versions of the content asset. Again, the table includes example content segment sizes (in kilobytes) and associated total download times (i.e., the time, in seconds, from sending a request for the segment to receipt of the entire segment) for the three different versions 1, 2, and 3 of the content asset. However, in this example, it is assumed that the average latency associated with receiving a segment of any one of the versions of the content asset is 0.5 seconds. As shown in the table of FIG. 2, because of the 0.5 second latency, the total segment download time of the segments of each version of the content asset will effectively increase by 0.5 seconds. Thus, the typical total segment download time for a segment of version 1 of the content asset may now be 0.0909090909 seconds. The total segment download time for a segment of version 2 of the content asset may now be 1.518716578 seconds, and the total segment download time for a segment of version 3 of the content asset may now be 2.0 seconds.

As further shown in FIG. 2, because of the added latency in this example, if estimated available bandwidth is determined by a user device based on the size and total download time of a most recently received segment, the user device will underestimate the available bandwidth. For example, if the user device is currently requesting and receiving segments of version 1 of the content asset, the user device may estimate the available bandwidth, based on the total segment download time of 0.909090909 seconds, to be 9.8 Mbps, when but for the introduced latency, the estimated available bandwidth should be closer to 21.84533333 Mbps. Thus, the user device may underestimate the available bandwidth in this example. As a result, the user device may choose to continue requesting and receiving segments of version 1 of the content asset (having the lowest quality), when the actual network bandwidth may be sufficient to support a switch to a higher bitrate version, such as version 2 or version 3. In such a scenario, the user device may be described as being stuck in an ABR "valley."

As another example, the user device currently may be receiving segments of version 3 of the content asset (the highest bitrate/quality version). However, due to the latency (0.5 s) added into the total segment download time of segments of that version, the user device may underestimate the available bandwidth to be 16.384 Mbps, when the estimated available bandwidth may actually be closer to 21.84533333 Mbps. In this example, the user device may determine to switch to a lower bitrate version of the content, such as version 1 or version 2, as the encoding bitrate of version 3 (18.7 Mbps) exceeds the now underestimated available bandwidth of 16.384 Mbps. However, the actual available bandwidth may be sufficient for the user device to have continued requesting and receiving segments of version 3 of the content asset.

As the foregoing examples illustrate, when there is latency associated with requesting and receiving segments of various versions of a content asset, a user device may not accurately determine when to switch to a lower or higher bitrate version of a content asset when performing ABR streaming. This may adversely affect the user experience, as the user device may incorrectly choose to switch to, or may incorrectly choose to continue receiving, a lower bitrate/quality version of a content asset. Accordingly, improved techniques for ABR streaming are needed.

FIG. 3 shows an example system 300. The system 300 may comprise a content source 302, an encoder 304, a content provider system 308, a computing device 310, and a content storage system 320. The content storage system 320 may be communicatively connected to a database 322 to store content.

The content source 302, the encoder 304, the content provider system 308, the computing device 310, the content storage system 320, and/or any other component of the system 300 may be interconnected via a network 306. The network 306 may comprise a wired network, a wireless network, or any combination thereof. The network 306 may comprise a public network, such as the Internet. The network 306 may comprise a private network, such as a network operated by a content provider. The network 306 may communicate using technologies such as wireless local area network (WLAN) technologies based on the Institute of Electrical and Electronics Engineers (IEEE) 802.11 standards, wireless cellular technology, Bluetooth, coaxial cable, Ethernet, fiber optics, microwave, satellite, Public Switched Telephone Network (PTSN), Digital Subscriber Line (DSL), BPL, or any other appropriate technologies.

A content source, such as content source 302, may comprise a headend, a television or movie studio, a video camera, a video on-demand server, a cable modem termination system, or the like, and/or any combination of the foregoing. The content source 302 may provide uncompressed, raw content, such as video content. The content source 302 and the encoder 304 may be implemented as a single device and/or may be co-located at a same geographic location. The content source 302 may provide the uncompressed content based on a request for the uncompressed content, such as a request from the encoder 304, the computing device 310, the content provider system 308, and/or the content storage system 320.

The content provider system 308 may receive a request for a content asset, such as a video content asset, from a user device, such as the computing device 310. The content provider system 308 may authorize/authenticate the request and/or the computing device 310 from which the request originated. The request for the content asset may comprise a request for linear content associated with a channel, a video on-demand content asset, a website address, a content asset associated with a streaming service, or the like, and/or any combination of the foregoing. The content source 302 may send the requested content to the encoder 304.

The encoder 304 may encode the content of the content asset. The encoder 304 may encode a plurality of different versions of the content. Each version of the content may be encoded at a different bitrate. Each version may have other properties that differ from other versions, such as a different compression technique, compression ratio, resolution, frame rate, video quality (for video), number of channels, or sampling rate (for audio). The encoder 304 may send the encoded content, such as one or more of the plurality of different versions of the content, to a requesting component, such as the content provider system 308. The content provider system 308 may send the requested content to a requesting user device, such as the computing device 310. The content provider system 308 and the requesting computing device 310 may employ ABR streaming to deliver (i.e., send) the requested content to the requesting computing device 310.

The content storage system 320 may store content. The stored content may comprise recorded content. The stored content may comprise archived content. The content storage system 310 may store a plurality of different versions of the content. Each version of the content may be encoded at a different bitrate. Each version may have other properties that differ from other versions, such as a different compression technique, compression ratio, resolution, frame rate, video quality (for video), number of channels, or sampling rate (for audio). The plurality of different versions of the content may be stored in the database 322. The stored versions of the content may be maintained for purposes of backup or archive. The stored versions of the content may be stored for later use as source content, to be provided for viewer consumption on a user device. The stored content may be provided to the content provider system 308 based on a request from a computing device 310 for the content.

A user device, such as the computing device 310, may comprise a decoder 312, a buffer 314, and a content player 316. The computing device 310 (e.g., the content player 316)

may be communicatively connected to a display 318. The display 318 may be a separate and discrete component from the computing device 310, such as a television display connected to a set-top box. The display 318 may be integrated with the computing device 310, such as a display screen of the computing device. The decoder 312, the content player 316, the buffer 314, and the display 318 may be realized in a single device, such as a laptop or desktop computer or a mobile device. The computing device 310 (and/or the computing device 310 paired with the display 318) may comprise a television, a monitor, a laptop, a desktop, a smart phone, a set-top box, a cable modem, a gateway, a tablet, a wearable computing device, a mobile computing device, any computing device configured to receive and/or output (e.g., playback) content, and/or any combination of the foregoing. The decoder 312 may decompress/decode the encoded content. The encoded content may be received from the content provider system 308 and/or the content storage system 320.

Figure 4:
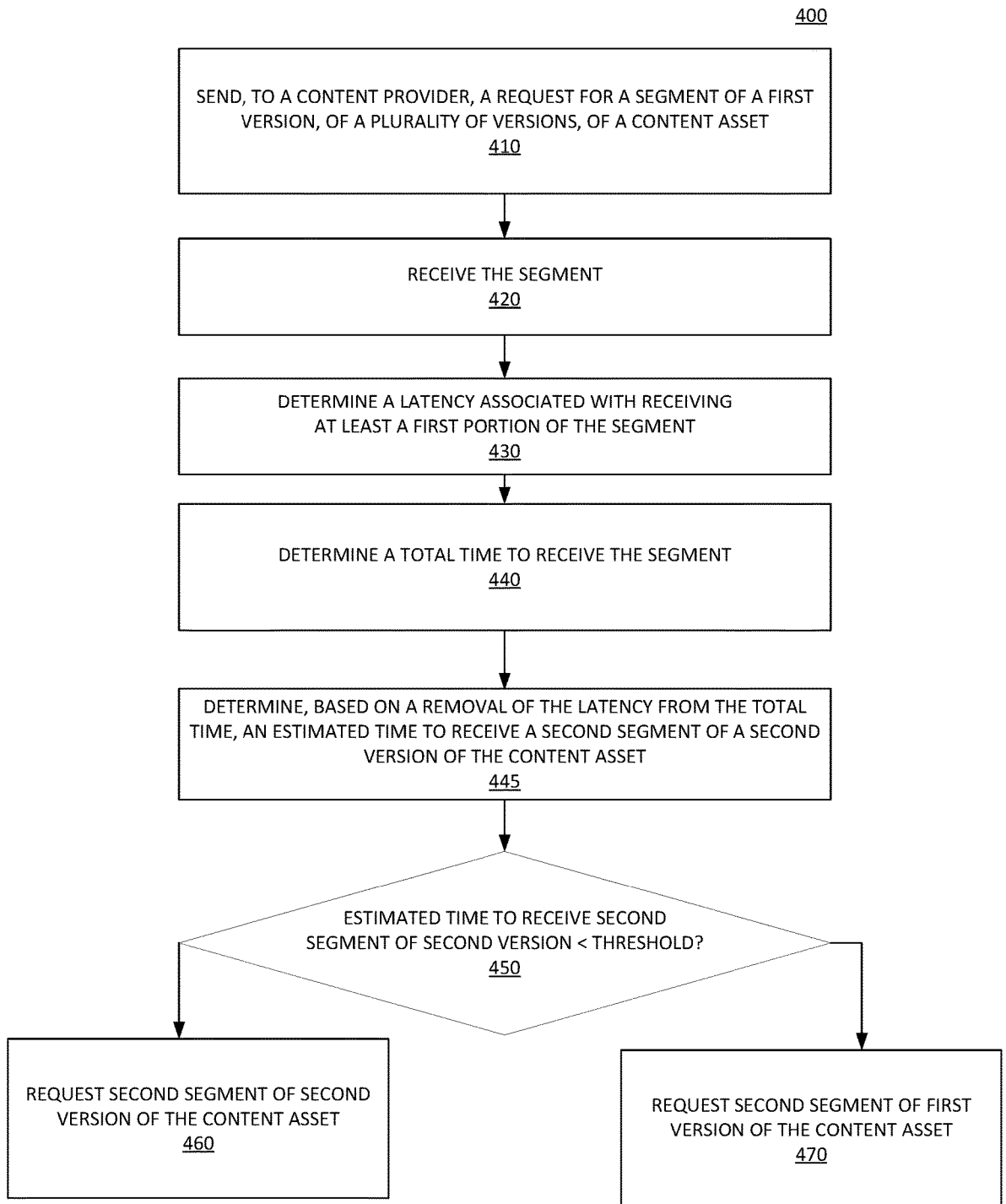
FIG. 4 shows an example method.

FIG. 4 illustrates a method 400. The method 400 may be performed by a user device, such as the computing device 310 of FIG. 3, as part of an ABR streaming process. In step 410, a user device may send, to a content provider, such as the content provider 308, content storage system 320, or content source 302 of FIG. 3, a request for a segment of a first version, of a plurality of versions, of a content asset. The content asset may comprise one or more of linear content, non-linear content, video content, audio content, multimedia content, a movie, a television show, a presentation a song, an album, a live broadcast, recorded content, stored content, or any other form of content. The request may be based on a manifest associated with the content asset. The request may comprise information from the manifest, such as a uniform resource identifier (URI) or uniform resource locator (URL), identifying a network location associated with the segment. The request may comprise a hypertext transfer protocol (HTTP) GET request comprising the URI or URL of the segment.

Each of the plurality of versions of the content asset may be encoded at a different bitrate. Each version may have other properties that differ from other versions, such as a different compression technique, compression ratio, resolution, frame rate, video quality (for video), number of channels, or sampling rate (for audio). Each version of the content asset may comprise a plurality of segments. Each segment may also be referred to as a chunk, fragment, or portion of the content asset. Each segment may be independently accessible from the network for playback on a user device.

Each segment may correspond to some portion of the playback time, or presentation duration, of the content. For example, each segment may have a presentation duration of two seconds of the content. Because the segments of different versions of the content may be encoded at different bitrates, segments of different versions that correspond to a same playback time/duration typically have different sizes. For example, a two second segment encoded at a higher bitrate may comprise more data (e.g., bits or bytes) than the corresponding two second segment encoded at a lower bitrate.

At step 420, the requested segment may be received by the user device in response to the request. The received segment may be stored at least temporarily to a buffer of the user device, such as the buffer 314 of FIG. 3, from which the content of the segment may be output for display to a user of the user device, such as output to the display 318.

At step 430, a latency associated with receiving at least a first portion of the segment may be determined. The latency may comprise an amount of time (e.g., in seconds or a fraction of a second) from the sending of the request for the segment to the receipt of the first portion of the requested segment. The first portion of the requested segment may comprise the first byte of the segment. The first portion of the requested segment may comprise the first bit of the segment. The latency may have been the result of a distance of the user device from the content provider, network or server congestion, the number of intermediate network devices the segment traversed from the content provider to the user device, packet queuing in the network, delays in retrieval of content from storage, such as database 322, processing delays, and other network, router, or server issues. Other causes of the latency may include time associated with setup of the transmission of the segment, encoding of the segment, network path set up, or other delays that may be introduced by the content provider or a head-end, server, or other computing device associated with the content provider.

In step 440, a total time to receive the segment (e.g., a total download time) may be determined. The total time to receive the segment may comprise an amount of time (e.g., in seconds or a fraction of a second) from the sending of the request for the segment to the receipt of the entirety of the requested segment. That is, the total time may comprise the amount of time from the sending of the request to the receipt of a last, or end, portion of the segment.

In step 445, an estimated time to receive a second segment of a second version of the content asset, different from the first version, may be determined. The estimated time to receive the second segment may comprise an estimate of a time from the sending of a request for the second segment to receiving the entirety of the second segment. The second version of the content asset may be encoded at a different bitrate than the first version. The second version of the content asset may be encoded at a higher bitrate, or a lower bitrate, than the first version. The determination of the estimated time to receive the second segment of the second version may be made in order for the user device to determine whether to switch to a lower or higher bitrate version of the content asset as part of an ABR streaming process.

The estimated time to receive the second segment of the second version of the content asset may be determined based on a removal of the determined latency associated with receiving the at least a first portion of the first segment of the first version of the content asset from the determined total time to receive the first segment. For example, the determined latency associated with receiving the at least a first portion of the first segment may be subtracted from the determined total time to receive the first segment. The determination of the estimated time to receive the second segment of the second version of the content asset may further be based on a size (e.g., in kilobytes) of the first segment. The determination of the estimated time to receive the second segment of the second version of the content asset may further be based on a size (e.g., in kilobytes) of the second segment. The sizes of the first and second segments may be obtained, for example, from the manifest associated with the content asset. The determination of the estimated time to receive the second segment of the second version may be calculated in accordance with the following Equation 1:

$$E = L + Y*(D-L)/X \qquad \text{Equation 1:}$$

where:
- E is the estimated time (e.g., in seconds) to receive the second segment of the second version of the content asset—from the time of sending a request for the second segment to the time of receiving the entirety of the second segment;
- L is the determined latency (e.g., in seconds) associated with receiving the at least the first portion of the first segment of the first version of the content asset;
- D is the determined total time (e.g., in seconds) to receive the first segment of the first version of the content asset;
- X is the size (e.g., in kilobytes) of the first segment of the first version of the content asset; and
- Y is the size (e.g., in kilobytes) of the second segment of the second version of the content asset.

Note that in Equation 1, the determined latency L is removed from the determined total download time D in the sub-expression (D−L). By subtracting the latency L from the total time D, the expression (D−L) effectively yields the amount of time from receiving the first portion of the first segment (e.g., the first bit or byte) to receiving the last, or end, portion of the first segment. Dividing (D−L) by the size X of the first segment (e.g., in kilobytes) in the sub-expression (D−L)/X yields the time to receive each byte of the first segment. Multiplying the time to receive each byte of the first segment by the size Y (in bytes) of the second segment in the sub-expression Y*(D−L)/X yields the estimated time to receive the second segment, from its first byte to its last. However, because the latency associated with receiving the first portion (e.g., first bit or byte) of the first segment is likely to apply equally to any request and receipt of the second segment, the latency value L may be added back into the equation of the estimated time E to receive the second segment of the second version of the content asset. Thus, $E = L + Y*(D-L)/X$.

In step 450, the estimated time to receive the second segment of the second version of the content asset may be compared to a threshold. The threshold may comprise some portion of the playback time, or presentation duration, associated with the content. The threshold may comprise a presentation duration associated with each segment of the plurality of versions of the content asset. For example, each segment may have a presentation duration of two seconds, four seconds, six seconds, or some other duration of time associated with presentation, output, or playback of the content asset. The threshold may comprise a percentage or fraction of the presentation duration associated with the segments, such as 80%, 90%, or some other percentage of the presentation duration.

If in step 450, it is determined that the estimated time to receive the second segment of the second version of the content asset satisfies the threshold, the user device may in step 460 send a request for the second segment of the second version of the content asset to the content provider. The request may be based on a manifest associated with the content asset. The request may comprise information from a manifest, such as a uniform resource identifier (URI) or uniform resource locator (URL), identifying a network location associated with the second segment. The request may comprise a hypertext transfer protocol (HTTP) GET request comprising the URI or URL of the second segment. The request may be sent to a same content provider server to which the request for the first segment was sent. The request may be sent to a different content provider server than the server to which the first segment was sent.

The estimated time to receive the second segment of the second version of the content asset may satisfy the threshold if the estimated time is less than the threshold. The estimated time to receive the second segment of the second version may satisfy the threshold if the estimated time is less than or equal to the threshold. As can be appreciated, so long as the estimated time to receive the second segment of the second version of the content asset is at least less than or equal to the presentation duration, the user device should be able to request and receive segments of the second version and output them for playback or display to a user of the user device without encountering problems, such as freezes or stalls, during output.

The user device may send the request for the second segment of the second version of the content asset in step 460 instead of requesting a second segment of the first version of the content asset. That is, in step 460, the user device may switch to requesting and receiving segments of the second version of the content asset. The second version of the content asset may be encoded at a higher bitrate than the first version, and the switch to the second version may improve the quality of the user experience. The user device may continue to request and receive segments of the second version of the content asset until a change in network conditions occurs—at which time the user device may choose to switch to requesting and receiving segments of another different version of the content asset.

If in step 450, it is determined that the estimated time to receive the second segment of the second version of the content asset does not satisfy the threshold, the user device may in step 470 send a request for a second segment of the first version of the content asset to the content provider. The estimated time to receive the second segment of the second version of the content asset may not satisfy the threshold if the estimated time is greater than the threshold. The estimated time to receive the second segment of the second version may not satisfy the threshold if the estimated time is greater than or equal to the threshold. Thus, if the estimated time to receive the second segment of the second version of the content asset does not satisfy the threshold, the user device may choose not to switch to the requesting and receiving segments of the second version of the content asset and may instead continue to request and receive segments of the first version of the content asset.

In a situation in which an estimated time to receive a second segment of the first version of the content asset also does not satisfy the threshold, the user device may repeat the method 400 for other lower bitrate versions of the content asset until it determines a lower bitrate version for which the estimated time to receive a second segment does satisfy the threshold, in which case the user device may request a second segment of that lower bitrate version of the content asset.

Whether the user device switches to the second version of the content asset (or some other version) or continues to request and receive segments of the first version of the content asset, the method of FIG. 4 may be repeated for another received segment of the content asset. The method 400 may be repeated as often as needed in the ABR streaming process until all of the content of the content asset requested by a user has been received. For example, the method 400 may be repeated periodically, such as on every n number of received segments. As another example, the method 400 may be repeated for each successive received segment, such that the user device is continually determining whether to switch to a different bitrate version of the content asset after receiving each successive segment of the content asset.

In step 445, alternatively or in addition, the user device may determine an estimated time to receive a second segment of each of a plurality of different other versions of the content asset, and in steps 450 and 460, alternatively or in addition, the user device may choose to request a second segment of the highest bitrate version of the content asset for which the respective estimated time to receive the second segment satisfies the threshold.

As can be appreciated from the foregoing description, by estimating a time to receive a second segment of a second version of a content asset in the manner described above—which takes into account the latency associated with receiving a segment of the content asset—the determination whether to switch to a higher or lower bitrate version of a content asset during ABR streaming may be more accurately made.

Figure 5:
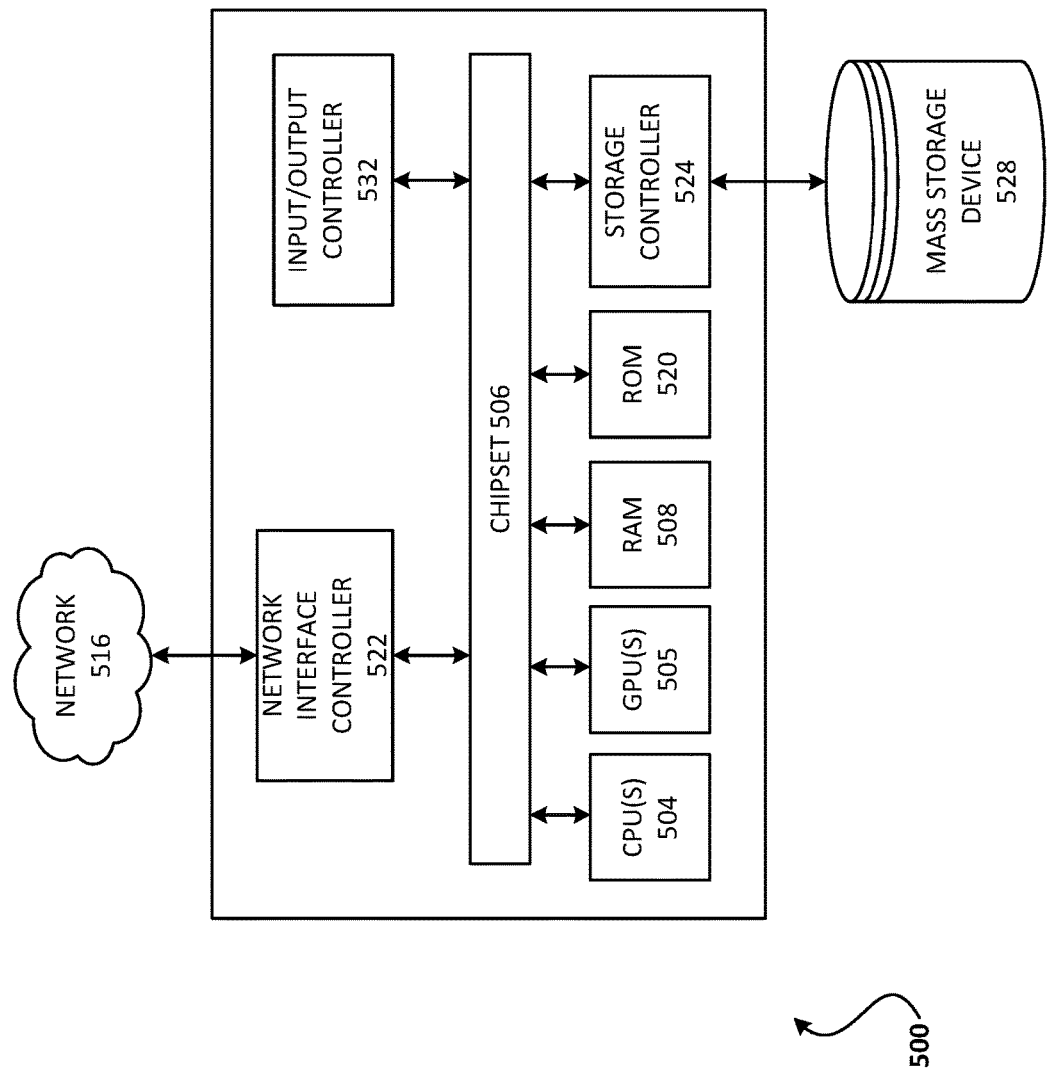
FIG. 5 shows an example computing device.

FIG. 5 depicts a computing device 500 that may be used to implement any one or more of the servers, components, modules, or devices depicted in FIG. 3. The methods described above and illustrated in connection with FIG. 4 may be performed by, or implemented on, a computing device, such as the computing device 500. The computing device 500 of FIG. 5 may comprise a server computer, workstation, desktop computer, laptop, tablet, network appliance, PDA, e-reader, digital cellular phone, mobile phone, smart phone, or other computing component or device.

The computing device 500 may include a baseboard, or "motherboard," which is a printed circuit board to which a multitude of components or devices may be connected by way of a system bus or other electrical communication paths. One or more processors, i.e., central processing units (CPUs) 504, may operate in conjunction with a chipset 506. The CPU(s) 504 may be standard programmable processors that perform arithmetic and logical operations necessary for the operation of the computing device 500.

The CPU(s) 504 may perform operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 504 may be augmented with or replaced by other processors or processing units, such as GPU(s) 505. The GPU(s) 505 may comprise processing units or processors specialized for, but not necessarily limited to, highly parallel computations, such as graphics and other visualization-related processing.

The chipset 506 may provide an interface between the CPU(s) 504 and the remainder of the components and devices on the baseboard. The chipset 506 may provide an interface to memory, such as a random-access memory (RAM) 508 used as the main memory in the computing device 500. The chipset 506 may further provide an interface to other memory or computer-readable storage media, such as a read-only memory (ROM) 520 or non-volatile RAM (NVRAM) (not shown), for storing instructions that may help to start up the computing device 500 and to transfer information between the various components and devices. ROM 520 or NVRAM may also store other software components necessary for the operation of the computing device 500 and performance of the methods described herein.

The computing device 500 may operate in a networked environment using logical connections to remote computing devices, nodes, or systems through network 516, which may comprise a local area network (LAN), a wide area network (WAN), the Internet, or any other public or private network. The chipset 506 may include functionality for providing network connectivity through a network interface controller (NIC) 522, such as a gigabit Ethernet adapter. A NIC 522 may be capable of connecting the computing device 500 to other computing devices over the network 516. It should be appreciated that multiple NICs 522 may be present in the computing device 500, connecting the computing device to other types of networks and remote computing devices, nodes, or systems.

The computing device 500 may be connected to another computer-readable storage medium, such as a mass storage device 528 that provides non-volatile storage for the computer. The mass storage device 528 may store system programs, application programs, other program modules, and data, which have been described in greater detail herein. The mass storage device 528 may store instructions that, when executed by the one or more processors 504, 506, may perform the methods described herein. The mass storage device 528 may be connected to the computing device 500 through a storage controller 524 connected to the chipset 506. The mass storage device 528 may consist of one or more physical storage units. A storage controller 524 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 500 may store data on the mass storage device 528 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 528 is characterized as primary or secondary storage and the like.

For example, the computing device 500 may store information to the mass storage device 528 by issuing instructions through a storage controller 524 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 500 may further read information from the mass storage device 528 by detecting the physical states or characteristics of one or more particular locations within the physical storage units.

In addition to the mass storage device 528 described herein, the computing device 500 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 500.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 528 depicted in FIG. 5, may store an operating system utilized to control the operation of the computing device 500. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 528 may store other system or application programs and data utilized by the computing device 500.

The mass storage device 528 or other computer-readable storage media may also be encoded with instructions that, when loaded into the computing device 500, transforms the computing device from a general-purpose computing device into a special-purpose computing device configured to implement the methods and other aspects described herein. These instructions transform the computing device 500 by specifying how the CPU(s) 504 transition between states, as described herein. The computing device 500 may have access to computer-readable storage media storing instructions that, when executed by the computing device 500, may perform the methods described in relation to FIG. 4.

A computing device, such as the computing device 500 depicted in FIG. 5, may also include an input/output controller 532 for receiving and processing user input from a number of input devices, such as a keyboard, a mouse, a touchpad, a touch screen, an electronic stylus, or other type of input device. Similarly, an input/output controller 532 may provide output to a display, such as a computer monitor, a flat-panel display, a digital projector, a printer, a plotter, or other type of output device. It will be appreciated that the computing device 500 may not include all of the components shown in FIG. 5, may include other components that are not explicitly shown in FIG. 5, or may utilize an architecture completely different than that shown in FIG. 5.

As described herein, a computing device may be a physical computing device, such as the computing device 500 of FIG. 5. A computing device may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems described herein are not limited to specific methods, specific components, or to particular implementations. It is also to be understood that the terminology used herein is for the purpose of describing particular aspects only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another implementation may include from the one particular value and/or to the other particular value. Similarly, when values are expressed as approximations, by use of the antecedent "about," it will be understood that the particular value forms another or additional aspect. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprises" and variations of the word, such as "comprising" and "comprises," means "including but not limited to," and is not intended to exclude, for example, other components, integers or steps. "Exemplary" and "example" mean "an example of" and are not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the above detailed description and the examples included therein and to the Figures and their descriptions.

As will be appreciated by one skilled in the art, the methods and systems may take the form of an entirely hardware, entirely software, or a combination of software and hardware. Furthermore, the methods and systems may take the form of a computer program product on a computer-readable storage medium having instructions (e.g., computer readable instructions or computer software) stored on the storage medium. More particularly, the present methods and systems may take the form of web-implemented computer software. Any suitable computer-readable storage medium may be utilized including hard disks, CD-ROMs, optical storage devices, magnetic storage devices, or the like.

Methods and systems are described above with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer readable instructions. These instructions may be loaded on a general-purpose computing device, special-purpose computing device, or other programmable data processing apparatus to produce a machine, such that the instructions which execute on the computing device or other programmable data processing apparatus create a means for implementing the functions specified in the flowchart block or blocks.

These instructions may also be stored on a computer-readable storage medium that may direct a computing device or other programmable data processing apparatus to function in a particular manner, such that the instructions stored on the computer-readable medium produce an article of manufacture. The computer readable instructions may also be loaded onto a computing device or other programmable data processing apparatus to cause a series of operational steps to be performed on the computing device or other programmable apparatus to produce a computer-implemented process such that the instructions that execute on the computing device or other programmable apparatus perform steps for implementing the functions specified in the flowchart block or blocks described herein.

The various features and processes described herein may be used independently of one another or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other features will be apparent to those skilled in the art from consideration of the specification and practices described herein. It is intended that the specification and example figures be considered as exemplary only, with a true scope and spirit being indicated by the following claims.

The invention claimed is:

1. A method comprising:
receiving, based on a request for a first segment of a first version of a plurality of versions of content, the first segment;
determining, based on an amount of time from a sending of the request for the first segment to receiving a first portion of the first segment, a latency associated with the receiving the first portion of the first segment; and
sending a request for a second segment, wherein a requested version of the second segment is based on an estimated time to receive a second segment of a second version of the content and the determined latency.

2. The method recited in claim 1, wherein the first portion of the first segment comprises one of a first bit or a first byte of the first segment.

3. The method recited in claim 1, wherein a size of the second segment differs from a size of the first segment, and wherein the determining the estimated time to receive the second segment of the second version of the content is further based on the size of the second segment of the second version of the content.

4. The method recited in claim 1, wherein determining the latency comprises calculating:

$$E=L+Y*(D-L)/X$$

where:
E is an estimated time to receive the second segment of the second version of the content;
L is the latency;
D is a total time;
X is a size of the first segment; and
Y is a size of the second segment.

5. The method recited in claim 1, wherein the first version of the content is encoded at a different bitrate than the second version of the content.

6. The method recited in claim 1, wherein the content comprises at least one of linear content, non-linear content, video content, audio content, multi-media content, a movie, a television show, a presentation, a song, an album, a live broadcast, recorded content, or stored content.

7. A method comprising:
sending, to a content provider, a request for a first segment of a first version of a plurality of versions of content;
receiving, based on the request, the first segment of the first version of the content;
determining a latency time based on the sending the request to receiving a first portion of the first segment;
determining, based on the latency time, an estimated time to receive a second segment of a second version of the content; and
sending, based on the estimated time to receive the second segment of the second version of the content, a request for the second segment of the second version of the content.

8. The method recited in claim 7, wherein the first portion of the first segment comprises one of a first bit or a first byte of the first segment.

9. The method recited in claim 7, wherein the determining the estimated time to receive the second segment of the second version of the content is further based on a size of the second segment of the second version of the content.

10. The method recited in claim 7, wherein the estimated time to receive the second segment of the second version of the content is determined according to the following equation:

$$E=T_1+Y*T_2/X$$

where:
E is the estimated time to receive the second segment of the second version of the content;
$T_1$ is the latency time;

T₂ is a second time from the receiving the at least a first portion of the first segment to receiving an end portion of the first segment;
X is a size of the first segment; and
Y is a size of the second segment.

11. The method recited in claim 7, wherein the first version of the content is encoded at a different bitrate than the second version of the content.

12. The method recited in claim 7, wherein the sending is further based on the estimated time to receive the second segment of the second version of the content satisfying a threshold.

13. The method recited in claim 12, wherein the threshold comprises a presentation duration associated with the content.

14. The method recited in claim 13, wherein the presentation duration comprises two seconds.

15. The method recited in claim 7, wherein the content comprises at least one of linear content, non-linear content, video content, audio content, multi-media content, a movie, a television show, a presentation, a song, an album, a live broadcast, recorded content, or stored content.

16. An apparatus comprising:
one or more processors; and
memory storing computer executable instructions that, when executed, cause:
receiving, based on a request for a first segment of a first version of a plurality of versions of content, the first segment;
determining, based on an amount of time from a sending of the request for the first segment to receiving a first portion of the first segment, a latency associated with the receiving the first portion of the first segment; and
sending a request for a second segment, wherein a requested version of the second segment is based on an estimated time to receive a second segment of a second version of the content and the determined latency.

17. The apparatus recited in claim 16, wherein the first portion of the first segment comprises one of a first bit or a first byte of the segment.

18. The apparatus recited in claim 16, wherein a size of the second segment differs from a size of the first segment, and wherein the determining the estimated time to receive the second segment of the second version of the content is further based on the size of the second segment of the second version of the content.

19. The apparatus recited in claim 16, wherein determining the latency comprises calculating:

$$E=L+Y*(D-L)/X$$

where:
E is an estimated time to receive the second segment of the second version of the content;
L is the latency;
D is a total time;
X is a size of the first segment; and
Y is a size of the second segment.

20. The apparatus recited in claim 16, wherein the first version of the content is encoded at a different bitrate than the second version of the content.

21. The apparatus recited in claim 16, wherein the content comprises at least one of linear content, non-linear content, video content, audio content, multi-media content, a movie, a television show, a presentation, a song, an album, a live broadcast, recorded content, or stored content.

22. An apparatus comprising:
one or more processors; and
memory storing computer executable instructions that, when executed, cause:
sending, to a content provider, a request for a first segment of a first version of a plurality of versions of content;
receiving, based on the request, the first segment of the first version of the content;
determining a latency time based on the sending the request to receiving a first portion of the first segment;
determining, based on the latency time, an estimated time to receive a second segment of a second version of the content; and
sending, based on the estimated time to receive the second segment of the second version of the content, a request for the second segment of the second version of the content.

23. The apparatus recited in claim 22, wherein the first portion of the first segment comprises one of a first bit or a first byte of the first segment.

24. The apparatus recited in claim 22, wherein the determining the estimated time to receive the second segment of the second version of the content is further based on a size of the second segment of the second version of the content.

25. The apparatus recited in claim 22, wherein the estimated time to receive the second segment of the second version of the content is determined according to the following equation:

$$E=T_1+Y*T_2/X$$

where:
E is the estimated time to receive the second segment of the second version of the content;
T₁ is the latency time;
T₂ is a second time from the receiving the at least a first portion of the first segment to receiving an end portion of the first segment;
X is a size of the first segment; and
Y is a size of the second segment.

26. The apparatus recited in claim 22, wherein the first version of the content is encoded at a different bitrate than the second version of the content.

27. The apparatus recited in claim 22, wherein the sending is further based on the estimated time to receive the second segment of the second version of the content satisfying a threshold.

28. The apparatus recited in claim 27, wherein the threshold comprises a presentation duration associated with the content.

29. The apparatus recited in claim 28, wherein the presentation duration comprises two seconds.

30. The apparatus recited in claim 22, wherein the content comprises at least one of linear content, non-linear content, video content, audio content, multi-media content, a movie, a television show, a presentation, a song, an album, a live broadcast, recorded content, or stored content.

* * * * *